Patented Jan. 12, 1954

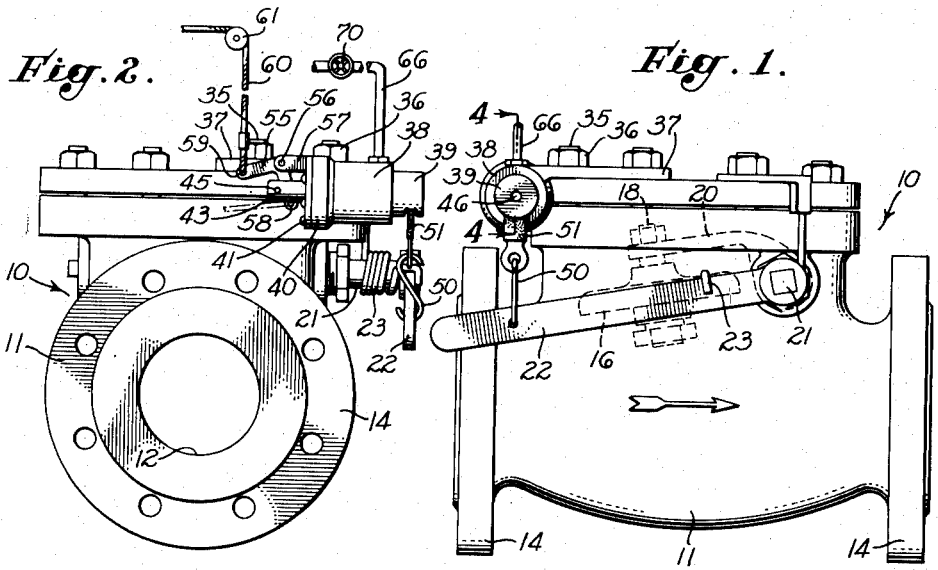

2,665,714

UNITED STATES PATENT OFFICE 2,665,714

VALVE

Dolphice H. Greenwood, Pasadena, Calif.

Application January 18, 1949, Serial No. 71,422

2 Claims. (Cl. 137—699)

This invention relates generally to the valve art and particularly to an automatic quick-closing valve.

Quick-closing valves are used quite extensively in various fluid systems and particularly in the oil industry. Such valves are commonly employed in pipe lines wherein oil or other liquid flows from one location to another, for example, in lines or headers which supply fluid to engines or other equipment in the oil field. Valves of this type are used as a protection against overrunning engines, slush pumps and other apparatus, the valves being capable of quickly shutting off the flow of fluid to prevent damage to the equipment. In other instances where oil or other combustible liquids are conveyed through pipe lines, valves of this character are included in the lines so that in the event of fire breaking out in an area adjacent the lines, the valves may be quickly closed to prevent spread of fire. Certain quick-closing valves now employed in various installations are capable of being controlled manually from points remote from the valves. Such valves include a gate member which is normally held in open position by suitable detent means, the latter being manually releasable from a remote location to permit automatic closing of the gate member under the action of spring means. The manual control for such valves commonly consists of a cable connected to the detent means and adapted to be pulled by an operator to disengage the detent means, although other means such as electromagnetic devices are sometimes employed for releasing the detent means. In any event, the control means, whether mechanical or electrical, involves relatively complicated structures and is not positive in action.

It is an object of this invention to obviate the deficiencies of previously employed valves of the quick-closing type by providing an improved control means for controlling the closing of the valve member or gate, the control means being adapted to operate the gate releasing means either manually or hydraulically.

Another object is to provide a valve control in which the detent means for normally retaining the gate in open position includes a piston slidable in a cylinder, the piston having an extension which normally supports a link connected to an arm of the valve member, the piston being in the form of a spring-pressed plunger and capable of being slid in a direction to release the link by a cable-actuated lever operatively connected to the plunger, or adapted to be slid within the cylinder in response to the pressure of fluid introduced into the cylinder.

A further object of the invention is to provide a valve control means of the character referred to in which the connecting link is of a fusible nature so that in the event of fire occurring in the vicinity of the valve, the link will be fused or melted to release the arm of the gate so as to permit closing of the latter to check the flow of fluid through the line in which the valve is incorporated.

A still further object of the invention is to provide an improved control means for quick-closing valves which is simple in construction and economical to manufacture, besides being positive in action and capable of being applied to quick-closing valves now in use.

Further objects will appear from the following specification and from the drawing, which is for the purpose of illustration only, and in which:

Fig. 1 is a side elevational view of a quick-closing valve embodying the present improved control means;

Fig. 2 is an end view of the same;

Fig. 3 is a longitudinal sectional view of the valve;

Fig. 4 is a longitudinal sectional view through the control cylinder, taken on line 4—4 of Fig. 1;

Fig. 5 is a similar view, taken on line 5—5 of Fig. 3; and

Fig. 6 is a cross-sectional view, taken on line 6—6 of Fig. 4.

Referring to the drawing in detail, my improved control means is therein illustrated as employed in connection with a quick-closing valve 10. The valve 10 includes a valve housing or body 11 having a longitudinal passage 12 and an offset recess 13 therein. The valve body 11 has flanges 14 at its ends by which it can be connected in a pipe line (not shown). Within the passage 12, adjacent the outflow end of the valve, is an annular seat member 15 which seats against the inner valve face of a valve member 16 so as to prevent flow of fluid through the passage. The valve member 16 is slidably mounted on a relief valve 18 which, in turn, is carried at the end of an actuating arm 20. The arm 20 is carried by a square portion of a shaft 21 extending transversely of the valve body 11 and having an end projecting from a side of the body (Fig. 2). Carried by the projecting square end of the shaft 21 is a control arm 22. An actuating spring 23, coiled around this end of the shaft 21 and having its ends respectively engaging the valve body 11 and the control arm 22, normally functions to pivot the latter downwardly so as to rotate the shaft 21 and the actuating arm 20 in a direction which causes the valve member to be forced against the seat member 15 to close the valve passage 12.

The relief valve 18 has a peripheral groove 25, an axial hole 26 and a transverse port 27 communicating between the hole 26 and the groove 25. One side of the groove 25 is tapered and provides a shoulder or seat 28 against which one end of the valve member 16 is urged by a spring 29 surrounding the relief valve and compressed between the valve member and a nut 30 on the relief valve. The groove 25, port 27 and hole 26 of the relief valve 18 together provide a by-pass means through which fluid can flow. When the valve member is in closed position it is retained in this condition by the fluid pressure within the valve body, as augmented by the force of the spring 23, and ordinarily it would require considerable manual force applied to the arm 22 to open the valve. However, due to the by-pass means, the arm 20 can move relative to the valve member 16 so as to unseat the latter from the shoulder 28 and thus permit flow of the fluid through the port 27 and hole 26. By retaining the arm 22 in this position for a short period of time, the fluid pressure becomes equalized on both sides of the valve member 16 so that the latter can be readily swung upwardly into the recess 13 without resistance to such movement.

As thus far described, the quick-closing valve 10 is similar to valves heretofore employed in the art. In such prior valves, it is common to retain the control arm 22 in raised position, against the action of the spring 23, by a movable detent means in the nature of a spring latch which engages a shoulder on the control arm or on the shaft 21. The spring latch is adapted to be retracted to release the control arm by means of a control cord connected to the latch and extending over suitable pulleys to a remote control station where it may be pulled by an operator to permit rapid closing of the valve when unusual conditions occur which require that the flow of fluid through the pipe be promptly arrested. While such a control means operates quite satisfactorily, it has been determined that if an unusual condition takes place while the operator is at a location away from the control cord, considerable time may be consumed in reaching the end of the cord so that prompt stoppage of the fluid flow is not attained. In an effort to alleviate this condition, I have devised a control means in which the detent means can be released hydraulically, as well as mechanically, so that by operating a valve in any of various hydraulic branch lines, the detent means can be retracted, this improved control means being constructed as next described.

Secured to the top of the valve body 11 by bolts 35 and nuts 36 is a bracket 37 which is provided with an integral cylinder member 38 having a closed end 39 and an open end 40 to which an end closure plate 41 is secured. A piston 42 is slidable within the cylinder 38 and has a rod 43 at one end which projects outwardly through a hole in the end plate 41 and is provided with a slot 44 and a pin 45 extending transversely across said slot. At its opposite side the piston 42 is provided with detent means in the form of an axial extension or detent pin 46 which is slidable in a bore 47 of the closed end 39 of the cylinder, the end 39 also having a slot 48 extending transversely of the bore. The piston 42 is normally urged toward the right, as viewed in Fig. 4, to cause its extension or pin 46 to extend across the slot 48 by means of a coil spring 49 surrounding the piston rod 43 and compressed between the end plate 41 and the piston 42. The detent pin 46 is adapted to hold the control arm 22 in the elevated position shown in Fig. 1 by link means to be next described.

Hooked through an aperture adjacent the end of the control arm 22 is one end of an S-shaped wire connecting link 50. The other end of the wire connecting link 50 is hooked through a hole in the lower end of a second link 51 which is of a fusible nature so as to be melted when subjected to heat of predetermined temperature. At its upper end, the fusible link 51 has a hole 52 (Fig. 6) through which the detent pin 46 can extend. When so disposed, the control arm 22 is retained in elevated position so as to maintain the valve member 16 open. When the pin 46 is retracted, that is, slid toward the left in response to like movement of the piston 42, the pin releases the link 51 to permit lowering of the control arm 22 and consequently closing of the valve.

The detent pin 46 is adapted to be retracted by an angular lever 55 which is pivoted on a pin 56 extending between ears 57 of the end plate 41. The lever 55 has one arm 58 projecting downwardly through the slot 44 of the piston rod 43 and a second arm 59 to which is secured one end of a control cable 60. The cable 60 may extend around one or more pulleys 61 (Fig. 2) to a remote control station, in position to be grasped and pulled by an operator to pivot the lever 55, pivotal movement of the lever 55 causing its arm 58 to engage the cross pin 45 to draw the piston 42 toward the left, as viewed in Fig. 5. As the detent pin 46 is withdrawn from the slot 48, it releases the link 51 to allow the control arm 22 to swing downwardly and the valve member 16 to move to closed position against the seat member 15, it being noted that since the flow of the fluid is in the direction of the arrow in Figs. 1 and 3, the fluid exerts a force against the valve member 16 which augments the force of the spring 23 so that the valve member is shut with a rapid snap action. In some installations, a control cable can be connected to the arm 58 of the lever 55 instead of, or in addition to, the arm 59. The lever 55 is also employed to reset the valve control means, the lever being first pivoted in clockwise direction to withdraw the detent pin 46, the control arm 22 pivoted upwardly to the position shown in Fig. 1, and the fusible link inserted in the slot 48, after which the lever 55 is released to allow the pin 46 to pass through the hole 52 of the link 51 to retain the control parts in the position illustrated in Figs. 1 and 4.

In accordance with the present invention, the valve releasing means is adapted to be controlled hydraulically. As shown best in Figs. 4 and 5, the wall of the cylinder 38 is provided with a port 65 into which is screwed the threaded end of a hydraulic line 66. Hydraulic fluid introduced into the right-hand end of the cylinder 38 through the port 65 exerts pressure against the piston to force the same toward the left, against the action of the spring 49 whereby to withdraw the detent pin 46 and release the link 51. Suitable sealing means 67 and 68, in the form of O rings are employed for preventing leakage of the hydraulic fluid past the piston 42 and from the cylinder. The hydraulic line 66 may extend to any suitable location or control station and be connected to any source of pressure fluid, a suitable valve 70 (Fig. 2) being included in the line and opened to permit flow of the fluid into the cylinder 38. In some instances, the valve 70 may be operated automatically in response to an overrunning condition existing in an engine, pump or other apparatus being supplied with fluid through the pipe line in which the valve 10 is incorporated. The line 66 may also have a plurality of branches, each connected to the source of fluid pressure and each having a valve 70, these valves being located at different points remote from the valve 10 to be controlled so that the latter can be controlled from any of a plurality of stations.

It has been stated that the valve 10 is adapted to be quickly closed in the event that a fire is present in the vicinity of the valve. This is a very desirable feature, particularly when the valve is used in a pipe line conveying combustible or explosive fluids. The means for effecting quick closing of the valve 10 consists of the fusible link 51 which normally retains the control arm 22 and valve member 16 in raised position. The fusible link 51 is made from a meltable material and when it is subjected to a dangerously high temperature it melts so that the control arm 22 is released, even though the detent pin 46 has not been withdrawn.

It is thus seen that the present invention provides mechanical and hydraulic means for controlling the operation of the valve member 16 from locations remotely spaced from the valve 10 and, in addition, means is provided whereby the valve member is automatically moved to closed position in response to an abnormally high temperature of the air adjacent the valve so as to shut off the flow of fluid through the valve and thus eliminate fire hazard.

It will be apparent that various modifications might be made in the construction of the valve control means within the scope of the appended claims.

I claim as my invention:

1. In a control device for controlling the actuation of an automatic, quick-closing valve having a movable valve element and operating means for moving the valve element to a closed position, the combination of: an arm operatively connected to the valve element; link means connected to said arm; movable detent means engageable with said link means to retain said arm in a position to maintain the valve element in an open position, said detent means being retractable to disengage said link means; spring means for biasing said detent means into an engagement with said link means; hydraulic control means for retracting said detent means out of engagement with said link means against the action of said spring means so as to disengage said detent means from said link means and thus permit movement of the valve element to its closed position, said hydraulic control means including a cylinder having a piston reciprocable therein and including means for admitting an operating fluid into such cylinder on one side of said piston, said detent means being rigidly connected to said piston and projecting through one end of said cylinder into engagement with said link means when said piston is adjacent said one end of said cylinder, said piston having a rod which extends through the opposite end of said cylinder; and manually operable means connected to said rod for moving said rod, said piston and said detent means simultaneously to retract said detent means out of engagement with said link means manually.

2. A control device according to claim 1 wherein said manually operable means includes a bell crank one arm of which is disposed in a slot in said rod and is operatively connected to said rod and the other arm of which has manual actuating means connected thereto.

DOLPHICE H. GREENWOOD.

References Cited in the file of this patent
UNITED STATES PATENTS

| Number | Name | Date |
| --- | --- | --- |
| 1,004,794 | Keeton | Oct. 3, 1911 |
| 1,039,693 | Burlingame | Oct. 1, 1912 |
| 1,069,681 | Dub | Aug. 12, 1913 |
| 1,081,822 | Ford | Dec. 16, 1913 |
| 1,233,898 | Miller | July 17, 1917 |
| 1,515,081 | Toelle | Nov. 11, 1924 |
| 1,897,678 | Schiorring | Feb. 14, 1933 |
| 1,966,735 | Sackett | July 17, 1934 |
| 2,012,873 | Gillen | Aug. 27, 1935 |
| 2,106,406 | Heaney | Jan. 25, 1938 |
| 2,110,691 | Aikman | Mar. 8, 1938 |
| 2,307,784 | Mapes | Jan. 12, 1943 |
| 2,320,567 | Carlson | June 1, 1943 |